United States Patent [19]

Schlapman et al.

[11] 4,358,300
[45] Nov. 9, 1982

[54] WELDING FUME AND SPARK TRAP

[75] Inventors: William J. Schlapman, Winneconne; James L. Wirsbinski, Marshfield, both of Wis.

[73] Assignee: J. I. Case Company, Racine, Wis.

[21] Appl. No.: 270,994

[22] Filed: Jun. 5, 1981

[51] Int. Cl.³ ............................................. B01D 47/02
[52] U.S. Cl. .................................... 55/245; 15/353; 55/248; 55/260; 55/419; 55/DIG. 20; 55/257 NP; 219/72; 228/221; 261/119 R
[58] Field of Search ................... 55/244–246, 55/248, 257 MP, 260, 419, 436, 465, 385 R, DIG. 20; 219/72; 228/221; 15/353; 261/119 R

[56] References Cited

U.S. PATENT DOCUMENTS

| | | | |
|---|---|---|---|
| 283,025 | 8/1883 | Rowan | 261/119 R X |
| 391,658 | 10/1888 | Smith | 261/119 R |
| 1,832,245 | 11/1931 | Runyon | 55/248 |
| 1,940,034 | 12/1933 | Wallace | 55/245 X |
| 1,994,766 | 3/1935 | Heglar | 55/246 X |
| 2,777,536 | 1/1957 | Thomas et al. | 55/248 |
| 3,166,393 | 1/1965 | Stevens | 55/419 X |
| 3,350,322 | 10/1967 | Waterhouse | 55/244 X |
| 3,509,911 | 5/1970 | Carsey | 55/419 X |
| 4,179,769 | 12/1979 | Lundquist | 15/353 |

FOREIGN PATENT DOCUMENTS 2002871  2/1979  United Kingdom ............ 55/385 R

*Primary Examiner*—Kathleen J. Prunner
*Attorney, Agent, or Firm*—Dressler, Goldsmith, Shore, Sutker & Milnamow

[57] ABSTRACT

An improved welding fume and spark trap includes a cannister and an inlet and outlet plenum for connection with an air filtration suction system designed to remove soot, fumes, and other particles from a welding area. The trap includes an internal baffle for reducing the velocity of the air stream passing through the trap, in this way promoting settling of particles suspended within the air stream into water contained within a water chamber defined by the bottom portion of the cannister.

4 Claims, 4 Drawing Figures

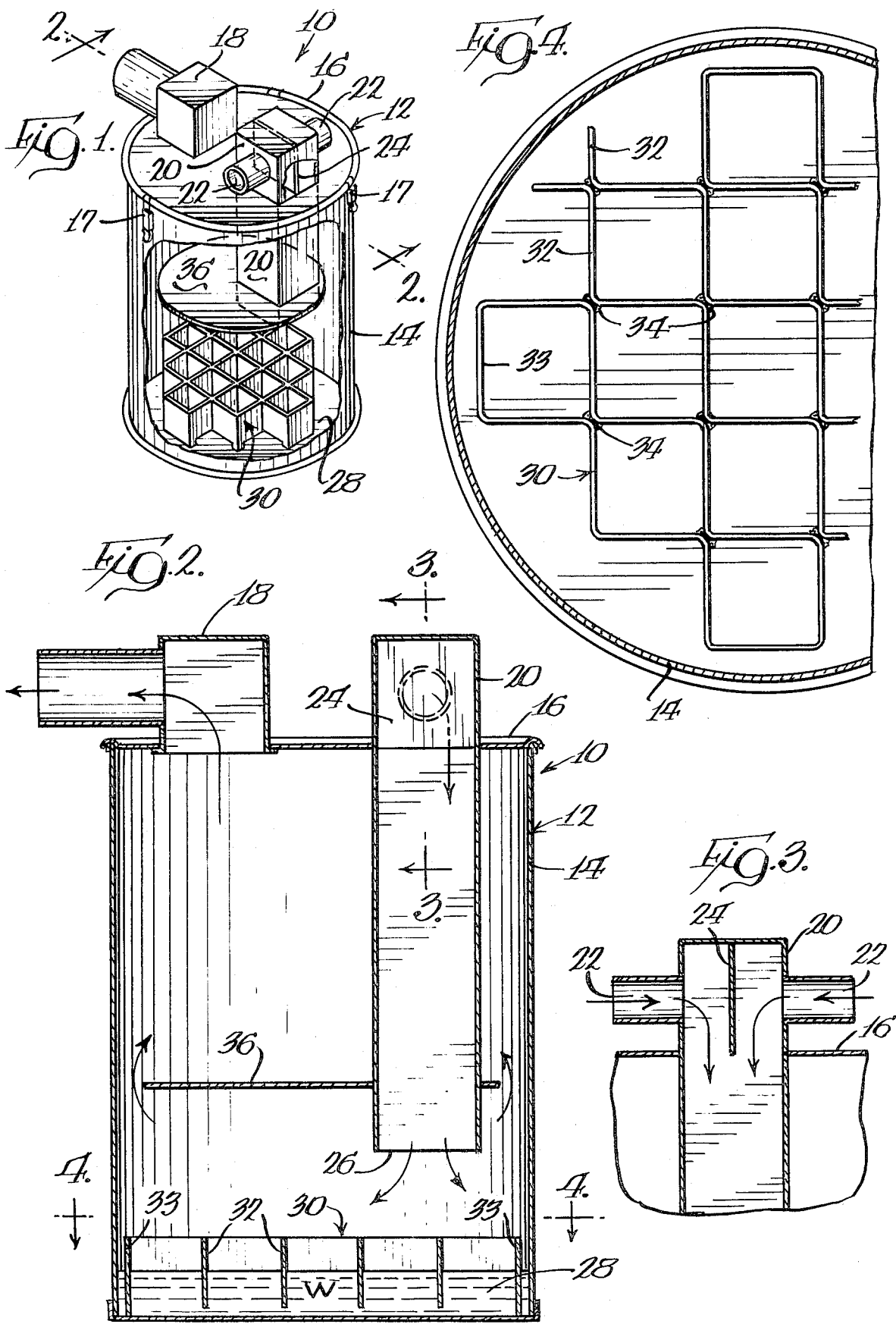

WELDING FUME AND SPARK TRAP

FIELD OF THE INVENTION

This invention relates generally to welding equipment and apparatus, and more particularly to an improved welding fume and spark trap for use with an air filtration system for drawing welding fumes, soot and sparks away from a welding area.

BACKGROUND OF THE INVENTION

Welding equipment is commonly used for the manufacture and fabrication of a wide variety of metal products. During welding, fumes, soot and sparks are generated, and in order to prevent their excessive build-up in the work area, it is desirable to employ some type of system for removing them from the area and filtering them out of the air before it is recirculated within the manfacturing facility. Filter systems such as this usually provide a flexible hose which is attached to or near the welding gun nozzle, and leads to a filter element and a source of air suction. In this way, fumes, smoke, sparks and other material generated during welding are drawn from the welding area into the flexible hose and to the filter element by the suction source.

Systems of the above type have exhibited two shortcomings in actual practice. First, hot sparks drawn from the welding area which are sucked into the system may be carried all the way to the filter element in which they lodge. Because of the air rapidly moving through the filtration system, these glowing sparks may be "fanned" and thus cause damage to the filter element. This problem is particularly pronounced when the filter element is made of paper, and the hot sparks contacting the paper element cause it to smolder and burn, frequently creating more smoke within the system than does the welding itself. Naturally, if a portion or all of the filter element is destroyed, the air containing the fumes, soot, sparks, and other particles is no longer filtered thus partially defeating the purpose of the system.

Another problem which is commonly associated with the above type of air filtering systems is that the impact of particles, soot, and other material upon the filter element frequently results in the inlet portion of the filter element becoming quickly clogged, thus dramatically decreasing the efficiency of the filter system.

Thus, an arrangement for use with a filtering system of the above type which would act to eliminate the above-described problems would be useful in increasing the efficiency of the systems, and would decrease operational down time of the system so that the maximum filtering and cleaning effect for the air in the welding area could be achieved.

SUMMARY OF THE INVENTION

The subject invention provides an effective and economical fume and spark trap for use with an air suction filtering system as described above. The trap arrangement is adapted to be disposed in the filtration system between the welding area, and the filter element and suction source. Thus, the air being drawn from the welding area, together with fumes, particles, and sparks is first moved through the trap before it is drawn through the system filter and returned to the atmosphere.

The subject fume and spark trap includes a generally upright enclosed cannister. An outlet is provided for connecting the interior of the cannister with the source of suction and the filter element downstream in the system. An inlet connects the interior of the cannister with one or more welding areas, which as described are usually provided with some type of flexible hose disposed on or near the welding gun nozzle. Thus, all air entering the system, including fumes, soot, and hot particles, is first drawn through the cannister before being filtered by the filter element of the system.

So that the fumes, particles, and other materials suspended within the air flowing through the system are cooled and/or removed from the air stream, the cannister defines a water chamber at the lower portion thereof. The inlet to the cannister is directed toward the water chamber, and in this way the air stream circulates within the cannister and is cooled by the water. Additionally, quantities of sparks, soot, and other particles drop into the water by gravity and are cooled or extinguished, and are thus removed from the air stream in order to decrease the filtering demands put upon the filter element of the system.

In order to promote contact of the air stream with the cooling water in the water chamber, the inlet to the cannister of the subject invention includes an inlet plenum which extends downwardly within the cannister toward the water chamber at the bottom thereof. In this way, the air stream being drawn from the welding area into the cannister is directed toward the water chamber and the cooling water, thus promoting contact of the air stream with the water.

Because the velocity of the air stream in filtering systems of the type described is frequently relatively high so that particles are suspended in the stream, it is desirable to slow the air stream down somewhat as it passes through the cannister of the trap so that as much of the soot or other particles being carried by the air stream may drop by gravity into the water within the water chamber of the cannister. To this end, the subject invention includes an internal baffle which is disposed between a discharge opening at the end of the inlet plenum and the outlet which connects the cannister with the filter system and suction source downstream thereof. In the preferred embodiment the internal baffle comprises a plate-like element which is connected to the inlet plenum, and extends therefrom toward the walls of the cannister. The edges of the baffle are spaced from the walls of the cannister, and thus the air stream moving out of the discharge opening of the inlet plenum circulates about the lower portion of the cannister before flowing about the edges of the baffle upwardly to the outlet of the trap. In this way, the velocity of the air stream is reduced somewhat as it moves across the water chamber, thus enhancing contact of the material in the air stream with the water in the chamber and promoting settling of soot, sparks, and other particles in the water within the chamber by gravity. Additionally, a partition is provided in the water chamber for further reducing the velocity of the air stream. The partition extends above the level of the water within the water chamber, and comprises a plurality of partition members which are formed to a grid-like labyrinth. Experience has shown that placement of the partition within the water chamber reduces the evaporation of water from the chamber into the air stream.

Thus, the subject invention provides an efficient and economical fume and spark trap arrangement for use with a welding air filtration system which is effective in removing soot, sparks, and other material from the air stream before it is passed to a filter element in the system.

BRIEF DESCRIPTION OF THE DRAWINGS

FIG. 1 is a perspective view in partial cutaway of the trap arrangement of the subject invention;

FIG. 2 is a cross-sectional elevation view taken along lines 2—2 in FIG. 1;

FIG. 3 is a partial cross-sectional view in elevation taken along lines 3—3 of FIG. 2;

FIG. 4 is a plan view, in cross-section, taken along lines 4—4 of FIG. 2.

DESCRIPTION OF THE PREFERRED EMBODIMENT

While the subject invention is susceptible to embodiment in different forms, there is shown in the drawings and will hereinafter be described a preferred embodiment with the understanding that the present disclosure is to be considered as an exemplification of the invention and is not intended to limit the invention to the embodiment illustrated.

With reference to FIGS. 1 and 2, therein is illustrated the welding fume and spark trap 10 of the subject invention. The trap 10 comprises a generally cylindrical cannister 12, although it will be appreciated that a cannister having any of a variety of configurations could easily be used. The cannister 12 includes a cannister bottom 14 and a cannister top 16. The cannister top 16 is adapted to seat against and seal the cannister bottom 14 so as to minimize air flow between their mating portions. Releasable latches 17 are provided so that the cannister top 16 may be easily joined to and removed from the cannister bottom 14.

With further reference to FIGS. 1 and 2, the trap 10 is provided with an outlet plenum 18 and an inlet plenum 20, each connected with the cannister top 16. As best shown in FIG. 2, the outlet plenum 18 opens directly into the cannister 12, and is adapted to be connected with the suction source of the air filtering system of which the trap 10 is a part. In distinction, the inlet plenum 20 extends through the cannister top 16 toward the bottom of the cannister bottom 14. As shown in FIG. 3, inlet plenum 20 includes a pair of inlet openings 22 which are adapted to be connected with flexible hoses or other suitable conduits which extend to welding areas where air filtration is desired. By providing a pair of inlet openings 22, the trap 10 may be easily connected with more than one flexible hose from more than one welding area, although more than two inlet openings may be provided. An inlet baffle 24 is provided within the inlet plenum 20 between the inlet openings 22 so that air flow from the inlet openings 22 is directed downwardly through the inlet plenum 20. Naturally, it will be understood that the inlet plenum 20 may be provided with only one inlet opening 22, or one of the inlet openings 22 may be capped or stopped-up if the trap 10 is only to be connected with a hose from one welding area.

As best shown in FIG. 2, the lower end of the inlet plenum 20 defines a discharge opening 26 through which the air stream from the welding areas is drawn. In this way, sparks, soot and other particles suspended within the air stream are directed downwardly within the cannister 12. The bottom portion of the cannister bottom 14 defines a water chamber 28. The water chamber 28 is adapted to contain water (W, shown only in FIG. 2) which is provided for trapping and cooling soot, sparks, and other particles which are suspended within the air stream as it discharges from the inlet plenum 20 through discharge opening 26.

Experimentation during the development of the subject invention has shown that the best results (i.e., maximum removal of particles within the air stream) are achieved when the velocity of the air stream from the welding area is relatively high until the air stream enters the inlet plenum 20 of the trap 10 and moves through the discharge opening 26. When the velocity of the air stream is relatively high, sparks and other particles generated in the welding area are better maintained in suspension within the air stream, thus encouraging their flow all the way to the trap 10. However, once the air stream from the welding area has entered the trap 10, it is desirable that the velocity of the air stream be significantly decreased. In this way, particles and other material within the air stream tend to settle within the water contained by the water chamber 28 by gravity. Additionally, reduction of the velocity of the air stream over the water chamber 28 reduces the amount of evaporation of the water within the chamber into the air stream. To this end, the subject invention provides several significant features as follows.

As shown in FIG. 2, a partition 30 is provided within the water chamber 28 and extends upwardly therefrom so that the level of the water within the water chamber 28 is lower than the top of the partition 30. In the preferred embodiment, the partition 30 comprises a grid-like labyrinth of partition members 32 and 33 defining water passages for the water in the chamber, the outer partitions 33 being longer to allow the water in the chamber to seek its own level and particle material to be evenly distributed over the bottom of the cannister. While other arrangements may be provided to perform the function of the partition 30, the arrangement illustrated in FIG. 4 has proved to be both effective and economical to fabricate. As shown, each of the partition members 32 and 33 may be formed from a single flat strip of material which may be easily bent to the shape shown in FIG. 4. After being so bent, each of the partition members 32 and 33 may be connected to adjacent members 32 and 33, such as by tack welds 34, so that water may flow about and between the partition members. In this way, an easily fabricated grid-like labyrinth is provided for the water chamber 28 defined by the bottom portion of the cannister bottom 14. Because the water level within the water chamber 28 is lower than the upper edges of the partition 30, the partition 30 acts to reduce the velocity of the air stream moving out of discharge opening 26 so that evaporation of the water into the air stream is minimized, and particles in suspension within the air stream tend to settle into the water by gravity.

In order to further reduce the velocity of the air stream as it circulates above the water chamber 28, the trap 10 of the subject invention is provided with an internal baffle 36. The baffle 36 is disposed within cannister bottom 14 between discharge opening 26 and outlet plenum 18 and, in the preferred embodiment, is connected with and supported by the inlet plenum 20. The baffle 36 comprises a plate-like element which extends from the inlet plenum 20 toward the walls of the cannister bottom 14. The edges of the baffle 36 are spaced from the wall of cannister bottom 14 so that the air stream discharging through opening 26 is reduced in velocity as it circulates beneath the baffle 36 and above the water chamber 28, and then passes about the edges of the baffle 36 and is drawn toward the outlet plenum 18 by the suction source of the filter system downstream of the trap 10. Tests have shown that this internal baffling arrangement provided for the trap 10 provides the desired results in that a significant quantity of the soot, sparks, and other particles suspended within the air stream drawn from the welding areas is deposited in the water contained within the water chamber 28. As a result, the demands put upon the filter element of the filtering system located downstream of the trap 10 are significantly reduced, thereby decreasing the down time of the system for filter element replacement and reducing the cost of replacement or cleaning of filter elements.

Use of the trap 10 disclosed herein with air filtering systems as described above has proven to be quite successful. Substantial amounts of soot, sparks, and other particles are found to have been trapped within the water contained within the trap 10, and the useful service life of filter elements provided within the filtering system downstream of trap 10 has been increased significantly. It will be appreciated that the trap 10 may be easily cleaned out by merely operating the releasable latches 17 so that the cannister top 16 can be removed. Since the outlet plenum 18, inlet plenum 20, and baffle 36 are also removed as the cannister top 16 is lifted from the cannister bottom 14, it is unnecessary that hose connections to the other parts of the filtering system be disconnected from the trap 10. After the cannister top 16 has been removed, the water and materials contained therein may be easily dumped from the cannister bottom 14, and the water chamber 28 refilled with fresh water. It will be noted that the internal baffle 36 could be provided in a manner other than shown (for instance, baffle elements could be connected with the walls of the cannister bottom 14 so that they extended thereacross) but the subject invention as shown in the preferred embodiment accommodates convenient and simple cleaning of the trap and replacement of the water supply therein.

Thus, the subject invention provides an improved fume and spark trap for a welding filtering system which reduces the filtering demands placed upon other portions of the filtering system, thus increasing its efficiency and reducing the maintenance normally associated with air filtering systems of this type.

From the foregoing, it will be observed that numerous variations and modifications may be effected without departing from the true spirit and scope of the novel concept of the subject invention. It will be understood that no limitation with respect to the specific apparatus illustrated herein is intended or should be inferred. It is, of course, intended to cover by the appended claims all such modifications as fall within the scope of the claims.

What is claimed is:

1. An improved fume and spark trap for an air filtering system adapted to be operatively connected between a source of air suction and a source of air-suspended fumes, particles and sparks comprising: closed cannister means defining a water chamber adapted to contain cooling water, and outlet adapted for connecting said cannister means with said source of air suction, passage means comprising an inlet plenum comprising a pair of inlet openings each adapted for connection with said source of air-suspended fumes, particles and sparks, an inlet baffle disposed between said inlet openings, said inlet plenum extending inwardly of said cannister means toward said water chamber and defining a discharge opening through which said fumes and sparks move, baffle means disposed within said cannister means between said discharge opening and said outlet for enhancing contact of the air-suspended fumes, particles and sparks with said water contained within said water chamber, whereby air-suspended fumes, particles and sparks drawn in either of said inlet openings by said air suction are directed toward said water chamber before being drawn out of the cannister means through said outlet.

2. The improved fume trap and spark arrestor of claim 1, and
   a partition disposed in said water chamber defining water passages for said water contained therein, said partition extending beyond said water chamber for decreasing the velocity of said air-suspended fumes, particles and sparks to promote contact with said water in said water chamber.

3. The improved fume trap and spark arrestor of claim 2, said partition comprising a grid-like labyrinth.

4. The improved fume trap and spark arrestor of claim 1, said cannister means comprising a cannister bottom defining said water chamber in the lower portion thereof, a cannister top connected with said inlet openings and outlet and adapted to be fit against the upper portion of said cannister bottom, and latch means for releasably connecting said cannister top to said cannister bottom.

* * * * *